United States Patent [19]

Kotegawa et al.

[11] Patent Number: 4,795,408
[45] Date of Patent: Jan. 3, 1989

[54] ROLLER CHAIN

[75] Inventors: Katsumi Kotegawa; Makoto Kanehira, both of Osaka, Japan

[73] Assignee: Tsubakimoto Chain Co., Japan

[21] Appl. No.: 79,399

[22] Filed: Jul. 30, 1987

[30] Foreign Application Priority Data

Aug. 4, 1986 [JP] Japan .................. 61-120014[U]

[51] Int. Cl.$^4$ ............................................. F16G 13/06
[52] U.S. Cl. ........................................ 474/209; 59/4; 384/138; 474/216
[58] Field of Search ................... 474/206–209, 474/215–217; 59/4; 384/138

[56] References Cited

U.S. PATENT DOCUMENTS

| 3,492,885 | 2/1970 | Nolte | 474/207 X |
| 4,615,171 | 10/1986 | Burk | 59/4 X |
| 4,704,099 | 11/1987 | Rohloff | 474/216 X |

Primary Examiner—Thuy M. Bui
Attorney, Agent, or Firm—Stevens, Davis, Miller & Mosher

[57] ABSTRACT

A roller chain having a thrust ring between a roller and a link plate for sustaining the transverse load, in which a thrust ring is made of bearing materials and has a sealing part in order to be put into the hole part formed on the end face of the roller to reserve the lubricant.

The sealing part prevent the lubricant from effluxing and prevent the dust from intruding into the inside of the roller.

4 Claims, 4 Drawing Sheets

ROLLER CHAIN

BACKGROUND OF THE INVENTION

Among the roller chains, in particular those being used as conveyor chains, most frequently used ones are such that allow the rollers to rotate while slidingly contacting with sorts of guides or the like.

In the roller chain having such a construction, the resistance in the running direction can be indeed reduced on account of the roller rotating over the outer circumferential face of the bush, but mitigation of the resistance attributable to the transverse load can not be expected because the transverse load acting on the roller is designed to be born by the sliding contact of the end faces of the roller with the inner faces of the link plate.

Under these circumstances, the applicant has proposed, for the purpose of diminishing the resistance attributable to the transverse load, a roller chain where a thrust ring using a bearing material is made to lie between the link plate and the end faces of the roller, in the Japanese patent application No. 140889 of 1985 and its corresponding U.S. patent application Ser. No. 878,699 filed June 26, 1986.

In a roller chain of this type, however, the thrust washer (c) lying between the inside face of the inside link plate (a) and the end face of the roller (b) is made in a flat form, as shown in FIG. 6. When the transverse load is applied to the roller chain, and this roller (b) leans to one side, as shown in FIG. 7, a big gap (d) is produced on the other side of the roller (b). Therefore there arises a problem that the lubricant being stored in the interior of the roller flows out, the foreign matter intrudes from above gap (d) into the interior of the roller to wear away both the roller and the bush, thereby shortening the life of the chain. Such a problem brings upon itself, notably in the case of the chain in which the roller houses the rolls (e) in the inside of itself, as shown in FIG. 6, a sort of a catastrophe where it becomes impossible in a short time for the roller chain to be used on the basis of the rotating face of the roll being damaged owing to the efflux of the above-mentioned lubricant or the intrusion of the foreign matter.

On the other hand, it is also thinkable to lessen the gaps between the end faces of the rollers and the thrust washers in order to avoid the occurrence of the inconveniences as mentioned above, however, there are many cases where the above mentioned gaps cannot be made small enough to prevent the efflux of the lubricant or the intrusion of foreign matter in the conveyor chain for the reasons of the torsion or warp being often produced in the chain, especially with a long chain, straightness of the rail guiding the rolls is required and more than that the chain is made by interconnecting a large number of links.

STATEMENT OF THE OBJECTS

The object of this invention is to provide a roller chain which has the ability not only to sustain the transverse load being applied to the roller but also to prevent the intrusion of foreign matter into the inside of the roller and the efflux of the lubricant therefrom, on the basis of the fundamental conception which the provision of a sealing part on the thrust ring lying between the roller and the link plate.

Other objects and advantages of this invention will be apparent during the course of the following description.

DETAILED DESCRIPTION

Figure 1:
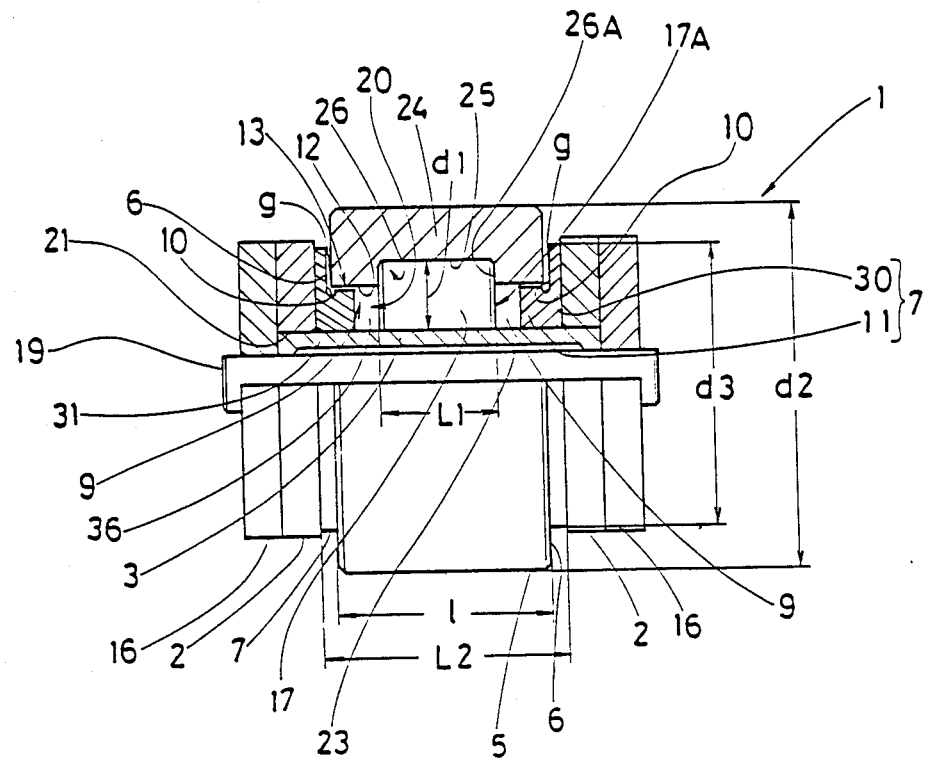
FIG. 1 is a sectional view showing an embodiment of this invention.
Figure 3:
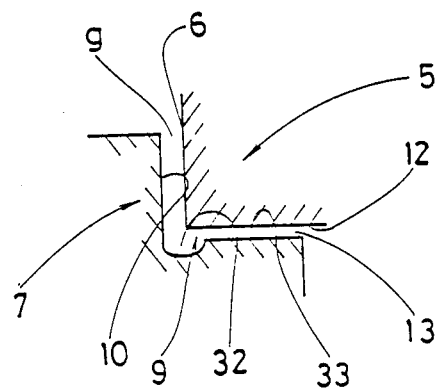
FIG. 3 is an enlarged sectional view showing the sealing part thereof.
Figure 2:
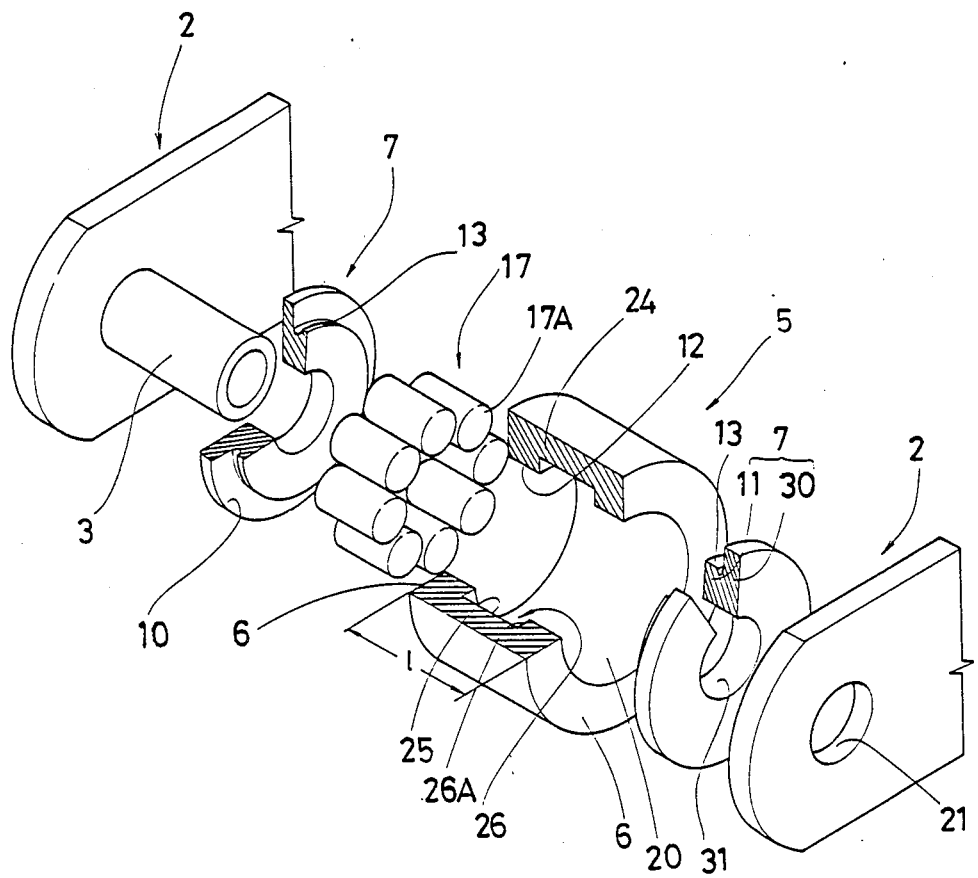
FIG. 2 is an exploded view in perspective of a portion of FIG. 1 to better illustrate the construction.

Referring to FIGS. 1 to 4, a roller chain 1 comprises a roller 5 being located around the outer circumference of a bush 3 which interconnects oppositely disposed inner link plates 2,2, and a pair of thrust rings 7,7 being mounted on said bush 3 and located between the both end faces 6,6 of the roller 5 and the respective link plates 2,2 with a small gap g therebetween. Said roller 5 has central opening 9,9 which are open at respective end faces concentrically with the axial center of the roller. Said thrust ring 7 is formed with a cylinder-shaped projecting portion 11 on the side face opposite to the roller 5 which is wider than the sum total of said small gaps g,g and is put put into said opening 9 in which the projecting portion 11 is provided with a sealing part 13 which is able to prevent lubricant-flow through the gap between the sealing part 13 and an inner periphery of the hole part 9.

In this example, the roller chain 1 is used for a conveyance, while the roller 5 is formed as what is called a roller containing rolls in which a plurality of rolls 17 . . . are arranged in parallel with the axial direction.

The inner link plate 2, as well as the outer link plate 16, made of punched steel plate, are of the same shape and both ends of each plate are in the form of a semi-circle. The inner link plates 2,2 oppositely disposed are connected by said bush 3 which is press-fitted tightly into the hole 21 located at the pitch point.

Further, the outer link plates 16, 16 are located outside the inner link plates 2,2 with their pitch points being alternately in coincidence. And by the pin 19 which passes through the bush 3 and of which both ends are press-fitted into the pitch hole of outer link plates 16,16, the link plates 2,2,16,16 are pivotally connected with each other. In the middle portion of the inner hole of the bush 3, is a cut-away portion 23 to reserve lubricant and to supply it into the clearance between the bush 3 and the pin 19 is formed.

The roller 5 in this example has both a plurality of rolls 17 . . . which are arranged on the outer periphery of the bush 3, and on the inner periphery of a cylinder-shaped base body 24 surrounding the rolls 17 . . .

Said rolls 17 is in the shape of a column of which the length is shorter than the width of the base body 24, and in this example, the rolls 17 . . . are located in parallel with the center-line of the bush 3 and are closely disposed around the outer circumferential face of said bush 3, adjoining each other.

The base body 24 takes the form of a cylinder and possesses an inner hole 20 which is open at the end faces 6.6 of both sides concentrically with the axial center thereof. And there is formed at the nearly central part of the inner hole 20 of the base body 24 a groove part 26 for holding the rolls 17 . . . The groove part 26 has a inner face 25 surrounding and encircling the rolls 17 . . . located around the bush 3 in contact therewith and the inner side face 26A extending inwardly along the end face 17A of the rolls 17 to prevent the rolls 17 . . . from slippage. The radial length L1 of said inner side face 26A is set at a length being more than 30% of the diameter d1 of the roll 17. The diameter d2 of the base body 24 is formed longer than the size in width of the inner link plate 2. On the other hand, the length of the base body 24 is formed shorter than the distance L2 between the inner link plate 2,2. As a result, a gap for the thrust ring 7,7 being mounted is formed between the both ends of the roller 5 and the respective inner link plates 2,2.

In this way, the roller 5 has the rolls 17 . . . located inside of the base body 24, and said inner hole 20 is formed as the hole part 9 which opens at the respective end faces 6,6 of the roller 5.

The thrust ring 7 is possessed of a bearing part 30 which lies in the gap between the inner face of the inner link plate 2 and the end face 6 of the roller 5, and a projecting portion 11 which is protuberantly mounted on the side face 10 of said bearing part 30 opposite to the side of the roller 5.

Incidentally, the thrust ring 7 is made of bearing materials being excellent in low frictional and wear-proof properties, for example, synthetic resin, such as fluororesin, acetal resin, phenol resin, and the like, oleo-sintered metal, ceramics, steel on which is conducted a surface-hardening treatment such as a nitriding treatment, a cementation treatment, or the like.

The bearing part 30 is in the shape of flat ring being slightly thinner than the width of said gap, and has a centerhole 31 into which the bush 3 is insertable. Consequently, the thrust ring 7 can be located between the roller and the inner link plate 2 with a small gap g. In this connection, it does not matter whether said hole 31 is floatingly fitted on the outer circumference of the bush 3 or statically situated thereat. Here the outer diameter d3 is set at nearly the same size as width of the inner link plate 2.

The projecting portion 11 which is fitted into said hole part 9, where in this example a surface 33 (see FIG. 3) is provided with the groove part 32 adjoining to said side face 10 between, and that surface 33 forms the sealing part 13 by allowing a little gap to lie between the surface 33 and said inner circumferential face 12 of said roller 5, in which the little gap is small enough to prevent lubricant-flow therefrom.

On the other hand, by making a projecting allowance of said surface 33 larger than the sum total of the small gaps g and g existing on both the sides of the roller 5, the sealing part 13 is formed wider than the sum total of the small gap g and g.

In turn, by making the thrust ring 7 lie between the roller 5 and the inner link plate 2, it is possible to form a lubricant-filled space 36 which is encircled by the inner end face of the projecting portion 11 of the thrust ring 7, the inner hole 20 of the roller 5, the outer circumferential surface of the bush 3, and the end face 17A of the roll 17, and which communicates with the gaps between the rolls 17 . . .

This lubricant-filled space 36 is shut off from outside through the medium of the sealing part 13 so as to prevent the efflux of the lubricant and the intrusion of the dust into that space 36.

The roller chain 1 is assembled as in the following. The plural rolls 17 . . . are located in the groove part 26, being in contact with the inner circumferential surface 13 of the base body 24 beforehand. And the bush 3 projected from one inner link plate 2 and having one thrust ring 7 thereon is inserted into the bore-like portion formed by rolls 17 . . . disposed circularly. And the bush 3 on which the other thrust ring is mounted is further press-fitted into the other inner link plate 2. As a result, an inner link having the roller 5 is assembled. Thereafter, the outer link plates 16,16, are connected with said inner link by the pin 19 passing through the bush 3 alternately.

As described above, the roller 5 is positioned by the inner link plate 2 along with the bearing part 30 of the thrust ring 7, whereby transverse slippage is prevented, the force in the transverse direction working between the roller 5 and the inner link plate 2 can be born by the latter so as to heighten the resisting force against the transverse load. On the other hand, the thrust ring 7 mitigates the frictional resistance and reduces the abrasion in the course of progress of such affairs as mentioned above on the basis of the utility of suitable bearing materials. Further, in the roller of this device, a large quantity of lubricant, such as, for example, grease can be filled up in its big lubricant space 36, and that since this lubricant-filled space 36 is shut off from the open air between the circumferential face 14 of the inserting part 11 of the thrust ring 7 and the inner circumferential face of the hole part 9 of the roller 5, there occurs neither the efflux of the lubricant from that space 36 nor the intrusion of dust and dirt thereinto, wherefore the abrasion is mitigated extending over a long period of time, the durability of the chain is increased, and the life thereof is prolonged.

Not only that, because that a small gap g is provided between the side face 10 of the thrust ring 7 and the end face 6 of the roller 5, the roller 5 can be rotate lightly while diminishing the tractive force when the load acts only in the direction of the onward movement, thereby becoming possible to follow the rail easily and to conduct a smooth conveyance.

Figure 4:
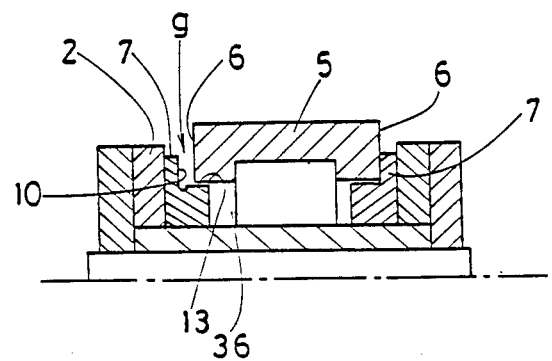
FIG. 4 is a sectional view showing the working thereof.

Further, as shown in FIG. 4, even when the roller 5 comes to inclining, because the sealing part 13 is provided in the situation being more than the total sum of the small gaps g,g at the side face, the sealing part 13 always shuts off the gap between the roller 5 and the thrust ring 7, whereby the lubricant filled space 36 is cut off from the open air on all such occasions. By the way, the groove part 32 neighboring to the sealing part 13 has the labyrinth effect to make sure of the prevention of the leakage of the lubricant the more.

EXAMPLE

Figure 5:
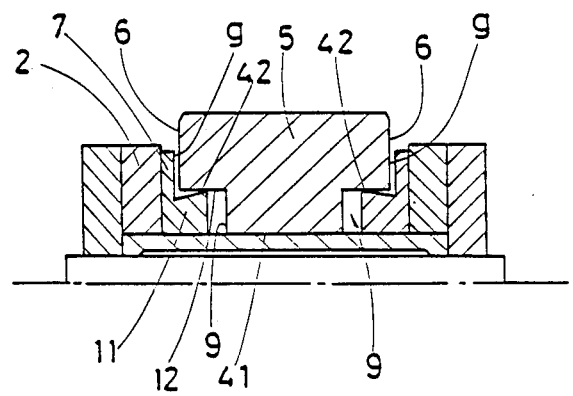
FIG. 5 is a sectional view showing another embodiment of this invention.
Figure 6:
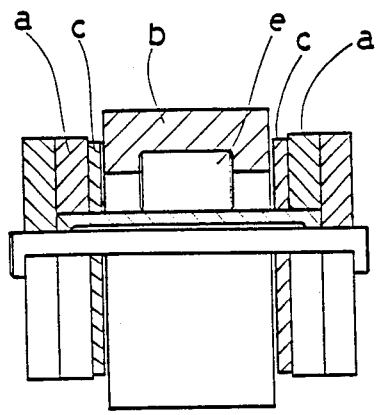
FIGS. 6 and 7 are sectional views showing a conventional roller chain.
Figure 7:
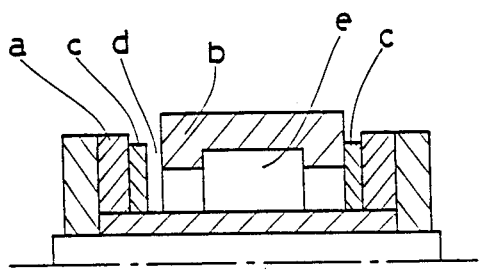

Another example of this device is shown in FIG. 5.

In this new example, the inner hole 41 of the roller 5 keeps in touch slidingly with the outer circumference of the bush 3, and there is provided at the end faces 6,6 on both side of the roller 5 with the hole part 9 being open at the respective end faces and having the inner circumferential face 12 larger in diameter than the diameter size of the inner hole 41 of the roller 5.

The thrust ring 7 is made of synthetic resinous material having the elasticity and low friction, for example, such as nylon. There is provided at the circumferential surface of the projecting portion 11 being wider than the sum total of the small gaps g,g, with a tapered portion 42 which juts out continuously to the peripheral edge of the above-mentioned circumferential surface. By making the diameter of the outside end part of the tapered portion 42 a little larger than the diameter of the above-mentioned inner circumferential surface 12, the outside end part of the tapered portion 42 fits into the inner circumferential surface 12 through the elastic deformation slidably. In this way, the tapered portion 42 forms the sealing part 13. This sealing part 13 has the ability to cut off the roller 5 from the open air.

By the way, the thrust ring can be made also by forming its main body by the use of bearing material, for example, such as ceramics, having rigidity, otherwise it can be also formed by sticking thereto a sort of the tapered portion using bearing material having the elasticity.

Like this, it is possible to modifying the roller chain according to this device into various embodiments.

EFFECT OF THE INVENTION

As described above, the roller chain of this invention is so designed that the thrust rings made of bearing material are made to lie between both the end face of the roller and the inner link plate with a small gap therebetween, and that referring to the thrust ring, there is provided at its projecting portion to be put into the central opening at the end face of the roller with the sealing part which can prevent lubricant-flow, and moreover that this sealing part is arranged being spaced out a distance larger than the sum total of the above-mentioned small gaps, wherefore the roller rotates lightly by virtue of the thrust ring being spaced out the above-mentioned small gaps; the running resistance of the chain can be diminished; the transmission capacity of the chain is enlarged; the thrust force acting on the roller can be sustained by the inner link plate; and it is possible to remarkably increase the durability against the transverse load. Further, since the sealing part is arranged in the situation being over the sum total of the above-mentioned small gaps, the sealing can be maintained even when the roller slips transversely, whereby it is possible always to prevent the intrusion of foreign matter into the inside of the roller and the efflux of the lubricant therefrom, and more than that, the life and the durability of the chain can be prolonged.

What is more, because the thrust ring is possessed of both bearing support of the thrust load and the sealing function at the same time, as mentioned above, the thrust ring according to the this device is simple in construction, thereby serving to cut down the price, as compared with the case where the members performing the respective functions are provided severally.

We claim:

1. A roller chain assembly for a roller chain comprising:
    a pair of inner link plates arranged generally parallel to each other and an elongated bush interconnecting said inner link plates;
    a roller rotatably mounted on said bush by means of an opening through said roller;
    at least a portion of said opening having a cross-sectional area greater than the cross-section area of said bush passing therethrough so as to define a lubricant reservoir within said roller;
    a pair of thrust rings fixed on said bush between the axial ends of the roller and an inner surface of the inner link plates so as to define at least one small gap;
    said thrust rings being made of bearing material and having a cylinder shaped axially projecting portion on an inner face thereof facing said roller so as to be receivable into said opening;
    said projecting portion being longer than the sum total length of said small gaps and having a sealing part which can prevent lubricant flow through a clearance between said sealing part and inner periphery of said opening.

2. The assembly of claim 1 in which said roller comprises a plurality of rolls arranged on the bush and a cylinder-shaped base body surrounding said rolls.

3. The assembly of claim 1 in which said thrust ring has a groove part around the outer periphery of said projecting portion between the inner face and the sealing part thereof.

4. The assembly of claim 1 in which said sealing part has a tapered portion positioned to be in contact with the inner periphery of the opening by elastic deformation of the tapered portion.

* * * * *